United States Patent
Rabie et al.

(10) Patent No.: US 8,665,900 B2
(45) Date of Patent: Mar. 4, 2014

(54) METHOD AND SYSTEM FOR QUALITY OF SERVICE SUPPORT FOR ETHERNET MULTISERVICE INTERWORKING OVER MULTIPROTOCOL LABEL SWITCHING

(75) Inventors: Sameh Rabie, Kanata (CA); Osama Aboul Magd, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 276 days.

(21) Appl. No.: 12/750,208

(22) Filed: Mar. 30, 2010

(65) Prior Publication Data
US 2010/0246603 A1 Sep. 30, 2010

Related U.S. Application Data

(63) Continuation of application No. 10/592,623, filed as application No. PCT/CA2005/000607 on Apr. 20, 2005, now Pat. No. 7,688,849.

(60) Provisional application No. 60/563,708, filed on Apr. 20, 2004.

(51) Int. Cl.
*H04J 3/22* (2006.01)

(52) U.S. Cl.
USPC ............. 370/466; 370/395.53; 370/395.6; 370/395.61

(58) Field of Classification Search
None
See application file for complete search history.

(56) References Cited

U.S. PATENT DOCUMENTS

| | | | |
|---|---|---|---|
| 5,923,655 | A | 7/1999 | Veschi et al. |
| 6,222,848 | B1 | 4/2001 | Hayward et al. |
| 6,304,551 | B1 * | 10/2001 | Ramamurthy et al. ....... 370/232 |
| 6,611,522 | B1 | 8/2003 | Zheng et al. |
| 6,625,169 | B1 | 9/2003 | Tofano |
| 6,751,221 | B1 | 6/2004 | Saito et al. |
| 6,912,225 | B1 | 6/2005 | Kohzuki et al. |
| 7,079,544 | B2 * | 7/2006 | Wakayama et al. ........... 370/401 |

(Continued)

FOREIGN PATENT DOCUMENTS

CA 2369534 A1 7/2002

OTHER PUBLICATIONS

Bot, "Key Technical Considerations When Using Ethernet Solutions in Existing ATM and Frame Relay Networks," IEEE Communications Magazine, Mar. 2004, pp. 96-102.

(Continued)

*Primary Examiner* — John Blanton
*Assistant Examiner* — Jay P Patel
(74) *Attorney, Agent, or Firm* — Christopher & Weisberg, P.A.

(57) ABSTRACT

A method and system for maintaining quality of service parameters for transmissions as a native Ethernet service between a first network having a first communication protocol and a second network having a second communication protocol that is different from the first communication protocol. The interworking device includes a first network interface operable to communicate with the first communication network using the first communication protocol, a second network interface operable to communicate with the second communication network using second communication protocol and a processing unit in communication with the first network interface and the second network interface. The processing unit receives a frame from the first network in the first communication protocol, maps parameters corresponding to quality of service parameters in the first communication protocol to quality of service parameters in the second communication protocol and assembles a data packet in the second communication protocol. The assembled data packet includes mapped quality of service parameters.

20 Claims, 8 Drawing Sheets

(56) References Cited

U.S. PATENT DOCUMENTS

| | | | |
|---|---|---|---|
| 7,185,112 B1 | 2/2007 | Kuranari et al. | |
| 7,212,536 B2 | 5/2007 | Mackiewich et al. | |
| 7,277,422 B2 | 10/2007 | Bostrom et al. | |
| 7,277,442 B1 | 10/2007 | Holmgren et al. | |
| 7,333,508 B2* | 2/2008 | Rabie et al. | 370/466 |
| 7,386,010 B2* | 6/2008 | Solomon et al. | 370/466 |
| 7,406,088 B2* | 7/2008 | Magd et al. | 370/401 |
| 7,417,995 B2* | 8/2008 | Rabie et al. | 370/401 |
| 7,483,411 B2* | 1/2009 | Weinstein et al. | 370/338 |
| 7,505,466 B2* | 3/2009 | Rabie et al. | 370/395.1 |
| 7,633,954 B2* | 12/2009 | Wakayama et al. | 370/401 |
| 7,768,993 B2* | 8/2010 | Giese et al. | 370/349 |
| 7,813,345 B2* | 10/2010 | Serbest et al. | 370/390 |
| 2001/0049739 A1 | 12/2001 | Wakayama et al. | |
| 2001/0055313 A1 | 12/2001 | Yin et al. | |
| 2002/0031131 A1* | 3/2002 | Yemini et al. | 370/401 |
| 2002/0031142 A1 | 3/2002 | Metin et al. | |
| 2002/0136224 A1 | 9/2002 | Motley | |
| 2002/0159462 A1 | 10/2002 | Demaria et al. | |
| 2002/0163889 A1* | 11/2002 | Yemini et al. | 370/238 |
| 2002/0176450 A1 | 11/2002 | Kong et al. | |
| 2003/0031182 A1 | 2/2003 | O'Neil et al. | |
| 2003/0053464 A1 | 3/2003 | Chen et al. | |
| 2003/0067934 A1 | 4/2003 | Hooper et al. | |
| 2003/0076838 A1 | 4/2003 | Shaio et al. | |
| 2003/0103503 A1 | 6/2003 | Dubuc et al. | |
| 2003/0110464 A1* | 6/2003 | Davidson et al. | 716/17 |
| 2003/0118026 A1 | 6/2003 | Kuhl et al. | |
| 2003/0126286 A1 | 7/2003 | Lee | |
| 2004/0022255 A1 | 2/2004 | Chen et al. | |
| 2004/0252717 A1* | 12/2004 | Solomon et al. | 370/466 |
| 2005/0068798 A1* | 3/2005 | Lee et al. | 365/49 |
| 2005/0141509 A1 | 6/2005 | Rabie et al. | |
| 2005/0157729 A1* | 7/2005 | Rabie et al. | 370/395.53 |
| 2005/0157750 A1* | 7/2005 | Rabie et al. | 370/466 |
| 2005/0157751 A1* | 7/2005 | Rabie et al. | 370/466 |
| 2005/0169279 A1* | 8/2005 | Magd et al. | 370/395.5 |
| 2005/0238049 A1 | 10/2005 | Delregno | |
| 2007/0058553 A1* | 3/2007 | Antal et al. | 370/248 |
| 2009/0225675 A1* | 9/2009 | Baum et al. | 370/252 |

OTHER PUBLICATIONS

Grossman et al., "Multiprotocol Encapsulation over ATM Adaptation Layer 5" (rfc 2684), Sep. 1999, entire document. Downloaded from http://www.faqs.org/rfcs/rfc2684.html (Address valid as of Jun. 24, 2008).

Luiz A. DaSilva, "QoS Mapping along the Protocol Stack: Discussion and Preliminary Results," Institute of Electrical and Electronics Engineers: ICC 2000. 2000 IEEE International Conference on Communications. Conference Record. New Orleans, LA, Jun. 18-21, 2000, New York, NY: IEEE, US vol. 2, Jun. 18, 2000, pp. 713-717, XP-001208744, ISBN: 978-0-7803-6284-0 *paragraph [II. Layered. Framework.for.QoS.assessment]*.

Tim Hale and Cam Cullen, "Mapping Ethernet CoS to ATM QoS", Internet Network World Website, Jun. 21, 1999, XP002670196, Retrieved from the Internet: URL:http://www.networkworld.com/news.tech/0621tech.html [retrieved on Feb. 23, 2012] *The whole document*.

Luca Martini et al., "Encapsulation Methods for Transport of Ethernet Frames Over IP/MPLS Networks draft-ietf-pwe3-ethernet-encap-05.txt", 20031201, vol. pwe3, No. 5, Dec. 1, 2003, XP015025991, ISSN: 0000-0004, *paragraph [3.5.qos.considerations]* and *paragraph [Appendix.B.Qos.details]*.

Supplementary European Search Report dated Mar. 26, 2012 for European Regional Patent Application Serial No. 05735573.7, EP Regional Entry Date: Sep. 18, 2006 consisting of.

All Sajassi, "Drop_Precedence_for_Ethernet_Frames" Cisco. com, Nov. 9, 2003 consisting of 14 pages.

* cited by examiner

| | ATM Layer Service Category | | | | | |
|---|---|---|---|---|---|---|
| 62 | CBR | rt-VBR | nrt-VBR | UBR/UBR+ | ABR | GFR |
| PCR & CDVT | specified | specified | specified | specified | N/A | specified |
| SCR, MBS, CDVT | N/A | specified | specified | N/A | N/A | N/A |
| MDCR/MCR | N/A | N/A | N/A | specified | specified | N/A |
| MCR, MBS, MFS, CDVT | N/A | N/A | N/A | N/A | N/A | specified |
| Peak-to-Peak CDV | specified | specified | unspecified | unspecified | unspecified | unspecified |
| MaxCTD | specified | specified | unspecified | unspecified | unspecified | unspecified |
| CLR | specified | specified | specified | unspecified | Network specific | Network specific |

Traffic Params 64

QoS Params 66

FIG. 5

| EVC Type 92 | MPLS Transport Tunnels 90 | | |
|---|---|---|---|
| | Single CoS LSP 80 | Group of single-CoS LSPs 82 | Single multi-CoS E-LSP 84 |
| Single CoS EVC | 1:1 mapping of connection & BW | Split BW profile according to Forwarding Map | 1:1 mapping of connection & BW |
| Multi-CoS EVC, single BW Profile | 1:1 mapping of connection & BW (Lose CoS) | Split BW profile according to Forwarding Map | 1:1 mapping of connection & BW |
| Multi-CoS EVC, multiple BW Profile | Aggregate BW (Lose CoS) | 1:1 mapping of connection & BW | Aggregate BW |

FIG. 8

METHOD AND SYSTEM FOR QUALITY OF SERVICE SUPPORT FOR ETHERNET MULTISERVICE INTERWORKING OVER MULTIPROTOCOL LABEL SWITCHING

CROSS-REFERENCE TO RELATED APPLICATION

This application is a Continuation of and claims priority to U.S. patent application Ser. No. 10/592,623, having a National Phase Entry date of Oct. 26, 2007 for PCT Application Serial Number PCT/CA2005/000607, filed Apr. 20, 2005, and claims the benefit of U.S. Provisional Patent Application No. 60/563,708, entitled METHOD AND SYSTEM FOR INTERWORKING OVER MPLS, filed Apr. 20, 2004, the entire contents of all which are incorporated herein by reference.

STATEMENT REGARDING FEDERALLY SPONSORED RESEARCH OR DEVELOPMENT

N/A

BACKGROUND OF THE INVENTION

1. Field of Invention

The present invention relates to the field of networking communications and more particularly to a method and system for allowing quality of service support across disparate networking technologies such as Frame Relay, ATM, Ethernet and Multiprotocol Label Switching (MPLS).

2. Description of the Related Art

Network technologies are not homogeneous. End-to-end connections can span multiple networking technologies, for example, Ethernet, asynchronous transfer mode (ATM), frame relay (FR), MPLS, and Internet protocol (IP). In addition, an Ethernet network may include multiple customer edge devices, switches, and routers. These components may communicate using different protocols, spanning the various layers of the OSI interworking model (e.g., L1-L7). For example, routers communicate using a layer three (L3) protocol while the switches communicate using a layer two (L2) protocol.

While solutions have been proposed to allow the transport of data between end points supported by disparate technologies, such solutions are typically inadequate solutions as they are limited to encapsulation and data extraction and simple repacketizing. These solutions fail to consider or address the preservation of aspects of the data transport environment such as quality of service, prioritization, etc. For example, user priority bits in an Ethernet frame are ignored and/or dropped when current technologies convert or encapsulate the data for delivery on the ATM, frame relay or MPLS portions of the network.

In addition, although there is a large push by service providers to offer MPLS core networks for the transport of their customer's' data, and while there have been proposals which provide for service interworking models between Ethernet and frame relay (or ATM) attachment circuits over an MPLS core, when the supported service is a native Ethernet service, these proposals do not consider the QoS aspects of the interworking. In particular, these proposals and their implementations do not address important aspects of networking such as Quality of Service ("QoS") mapping between heterogeneous attachment circuits (AC) and do not address QoS mapping between these ACs and MPLS core. As used herein the term attachment circuit refers to the portion(s) of the end-to-end communication circuit that connects the user device to the service provider network, for example, ACs may be used to provide access to a service provider's MPLS core backbone network.

SUMMARY OF THE INVENTION

The invention describes an architecture and methods that enable QoS mapping between Ethernet and ATM, and Ethernet and frame relay networks with single or multiple QoS levels, with different levels of performance guarantees. The invention also describes an architecture and methods that enable QoS mapping between Ethernet, frame relay and ATM, and an MPLS core.

According to one aspect, the present invention provides an interworking device for maintaining quality of service parameters for transmissions as an Ethernet service between a first network having a first communication protocol and a second network having a second communication protocol that is different from the first communication protocol. The interworking device includes a first network interface operable to communicate with the first communication network using the first communication protocol, a second network interface operable to communicate with the second communication network using the second communication protocol and a processor in communication with the first network interface and the second network interface. The processing unit receives frames from the first network in the first communication protocol, maps at least one parameter corresponding to a quality of service bandwidth mapping parameter in the first communication protocol to at least one quality of service parameter in the second communication protocol, the at least one quality of service parameter in the second communication protocol being selected from a group consisting of peak rate, token bucket size and token rate and assembles data packets in the second communication protocol. The assembled data packets having at least one mapped quality of service parameter.

According to another aspect, the present invention provides a method for maintaining quality of service parameters for transmissions as an Ethernet service between a first network having a first communication protocol and a second network having a second communication protocol that is different from the first communication protocol, in which a frame is received from the first network in the first communication protocol. At least one parameter corresponding to a quality of service bandwidth mapping parameter in the first communication protocol is mapped to at least one quality of service parameter in the second communication protocol. The at least one quality of service parameter in the second communication protocol is selected from a group consisting of peak rate, token bucket size and token rate. Data packets are assembled in the second communication protocol. The assembled data packets include at least one mapped quality of service parameter.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5 is a table of ATM Layer Service Categories;

FIG. 8 is a table showing bandwidth mapping for different types of Ethernet Virtual Connections (EVC).

DETAILED DESCRIPTION OF THE PREFERRED EMBODIMENTS

This application is related to U.S. patent application Ser. No. 10/990,899, filed Nov. 17, 2004, entitled, METHOD AND SYSTEM FOR FRAME RELAY AND ETHERNET SERVICE INTERWORKING, and U.S. patent application Ser. No. 11/008,709, filed Dec. 9, 2004, entitled, METHOD AND SYSTEM FOR ETHERNET AND FRAME RELAY NETWORK INTERWORKING, and U.S. patent application Ser. No. 11/011,331, filed Dec. 13, 2004, entitled METHOD AND SYSTEM FOR ETHERNET AND ATM SERVICE INTERWORKING, and U.S. patent application Ser. No. 11/018,671, filed Dec. 21, 2004, entitled METHOD AND SYSTEM FOR ETHERNET AND ATM NETWORK INTERWORKING, the entirety of all of which are incorporated herein by reference.

Architecture

Figure 1:
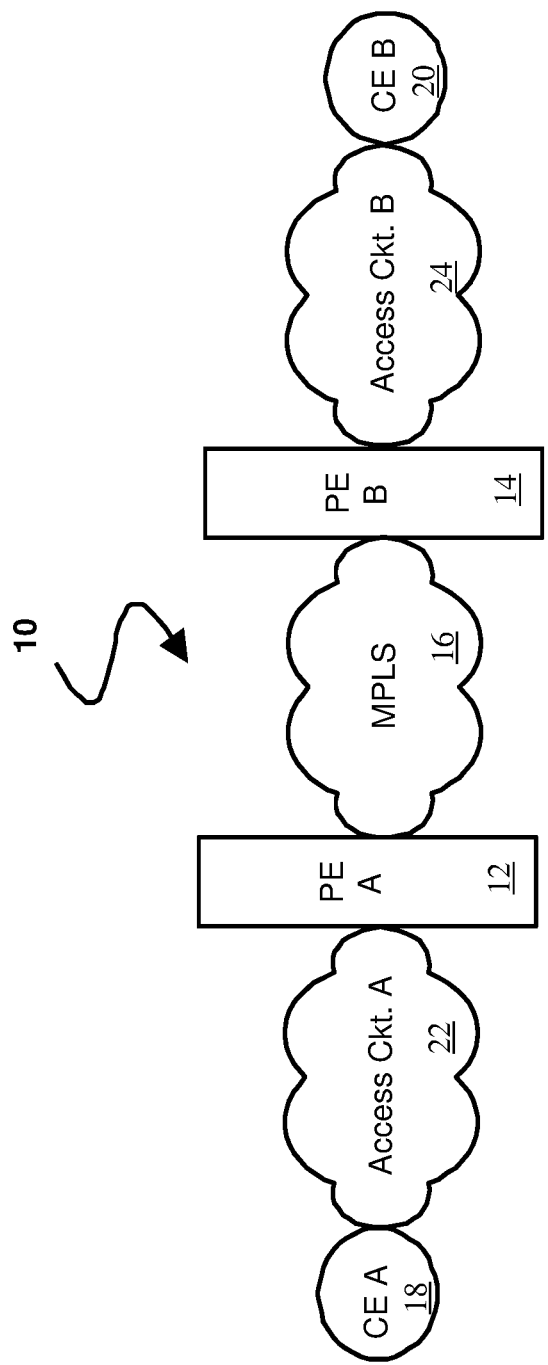
FIG. 1 is a block diagram of a network architecture constructed in accordance with the principles of the present invention.

Referring now to the drawing figures in which like reference designators refer to like elements, there is shown in FIG. 1, a system constructed in accordance with the principles of the present invention and designated generally as "10". System 10 includes provider edge devices PE A 12 and PE B 14 coupled to MPLS network 16. PE A 12 and PE B 14 include the interworking functions (IWF) described herein. Customer edge devices CE A 18 and CE B 20 are in communication with PE A 12 and PE B 14, respectively, through respective attachment circuits A 22 and B 24. Attachment circuits A 22 and B 24 can be any network circuit capable of transporting information from the customer edge device to the provider edge device. The protocols supported by CE A 18 and CE B 20, attachment circuits A 22 and B 24 and PEs A 12 and B 14 e can include, for example, Ethernet, asynchronous transfer mode (ATM), frame relay (FR), point-to-point protocol (PPP), multi-protocol label switching (MPLS), and Internet protocol (IP). Customer edge (CE) devices A and B 18 and 20, for example, routers, switches, etc., serve to interface customer networks (not shown) to system 10. Router, switches, etc. for interconnecting a customer device or network to another network such as a service provider network are known in the art. In the most general sense, PE A and B devices 12 and 14 (also referred to herein as IWF A 12 and IWF B 14 devices, respectively) provide interworking functionality and establish relevant parameters with MPLS network 16.

As used herein, the term "network interworking" refers to the inter-working between networks using similar protocols, e.g., Ethernet, across an intermediary/core network, e.g., MPLS network 16. In network interworking, all or part of the protocol control information used in the two similar networks are transparently transferred by an interworking function across the intermediary/core network. As part of this function, the IWF encapsulates the information which is transparently transferred through the other disparate network. The interworking tasks are performed at IWFs 12 and 14 in a manner that is transparent to customer edge devices/end users. In general, as is described in detail below, IWFs 12 and 14 perform protocol encapsulation and mapping as well new header generation.

Advantageously, this arrangement provides Layer 2 (L2) connectivity in a manner that allows the transport of multiple upper layer protocols such as Internetwork Packet Exchange (IPX), Standard Network Architecture (SNA), and the point-to-point (PPP) protocol, thereby minimizing/obviating the need for Layer 3 (L3) routing such as internet protocol (IP) routing.

Figure 2:
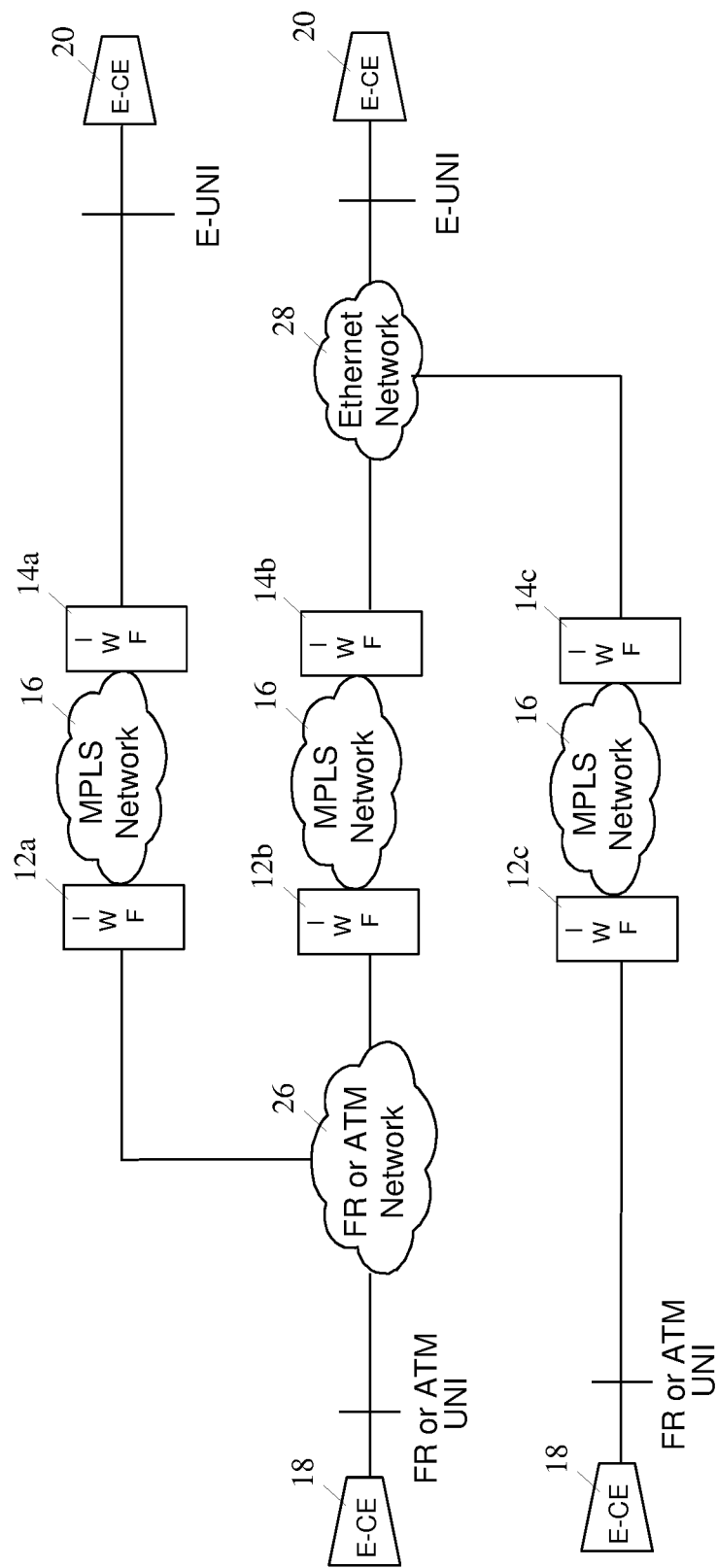
FIG. 2 is a block diagram of another network architecture constructed in accordance with the principles of the present invention.

Referring to FIG. 2, another network architecture for system 10 is shown. In the example of FIG. 2, a number of different connectivity scenarios are shown to aid understanding of the scope of the present invention. As is shown, the end to end native service is Ethernet and the MPLS core network 16 transports the Ethernet over MPLS using an Ethernet Pseudo Wire. An Ethernet Pseudo Wire is a connection that emulates Ethernet over a packet switched network such as MPLS. The functions of Ethernet Pseudo Wire include encapsulating service-specific protocol data units arriving at an ingress port such as the ingress port of IWF A 12, and carrying them across a path or tunnel through MPLS network 16, managing their timing and order, and any other operations required to emulate the behavior and characteristics of the Ethernet service as faithfully as possible. From the customer perspective, the Ethernet Pseudo Wire is perceived as an unshared link or circuit of the chosen service.

Two heterogeneous interworking arrangements are shown in FIG. 2, and are discernable by the type of attachment circuit; Ethernet to frame relay and Ethernet to ATM. Ethernet customer edge A devices 18 communicate with Ethernet customer edge B devices 20 through MPLS network 16. However, the attachment circuits used to provide network connectivity can differ. For example, Ethernet customer edge A device 18 can include frame relay or ATM protocol support and be coupled to an IWF, such as IWF 12c, through a direct frame relay or ATM connection, or can be coupled to an IWF, such as IWF 12a or IWF 12b, through a frame relay or ATM network 26. If an Ethernet user to network interface (UNI) is used, as is shown by Ethernet customer edge B devices 20, devices 20 can be directly connected to an IWF such as IWF 14a or can be connected to an IWF, such as IWFs 14b and 14c via an Ethernet network 28.

IWF devices 12 (such as 12a, 12b and 12c) and 14 (such as 14a, 14b and 14c) can be stand alone computing devices arranged to implement the functionality described herein or can be integrated as part of other networking components such as routers and switches as are known in the art. If implemented as a standalone computing device, IWF devices 12 and 14 include a processing unit, memory, input and output interfaces as well as network communication interfaces as may be implemented by one of skill in the art to implement the functions described herein.

As is described below in detail, the present invention provides an arrangement for mapping QoS parameters between the attachment circuits at the UNI. Ethernet to frame relay and Ethernet to ATM mappings are described herein. Mappings between frame relay and ATM are known. The present invention, as is described below, also provides an arrangement for QoS mapping between Ethernet and MPLS core 16.

Figure 3:
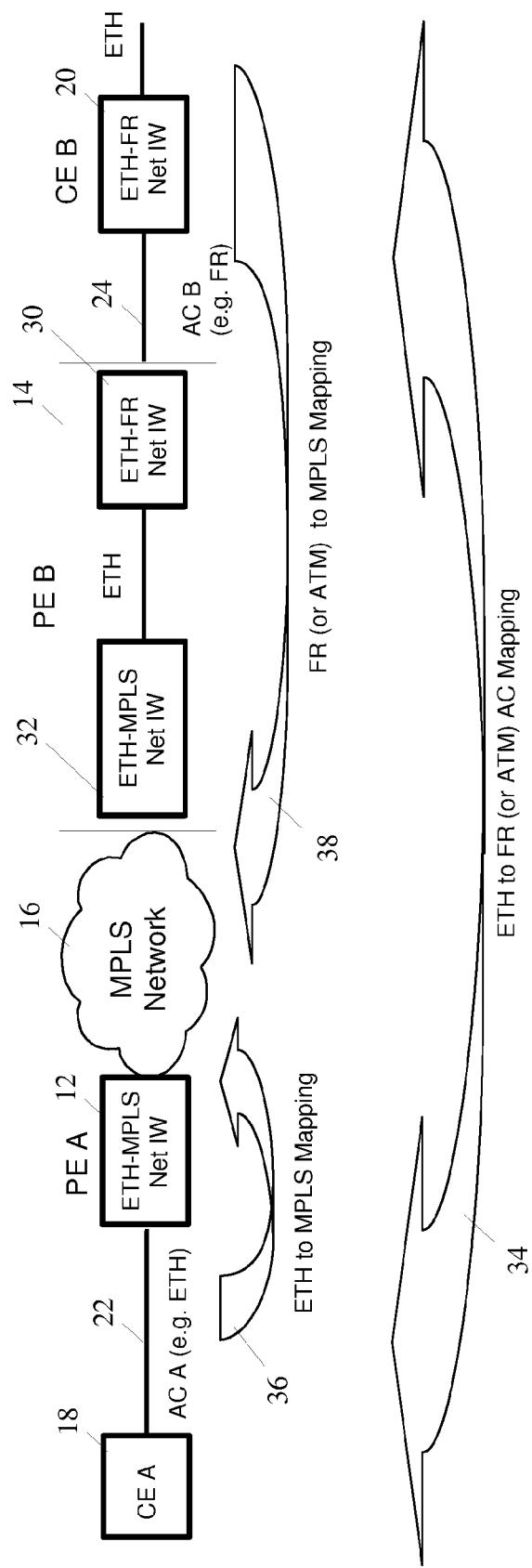
FIG. 3 is a diagram showing an architecture along with exemplary interworking mapping options for the present invention.

Exemplary interworking mapping options for the present invention are described with reference to FIG. 3. Initially it is noted that, although FIG. 3 shows Ethernet to frame relay interworking, it is understood that the invention is equally applicable to Ethernet to ATM interworking. Details for the application of FIG. 3 to Ethernet to ATM interworking are described below. As is shown in FIG. 3, PE A 12 performs Ethernet to MPLS interworking. This traffic is then carried over MPLS core network 16 using an Ethernet Pseudo Wire.

However, the invention is not so limited as to operate only in a manner in which a single device performs a single interworking function, e.g., Ethernet to MPLS interworking. PE B 14 is shown as performing two logical interworking functions, namely an Ethernet to frame relay network interworking function 30, and an Ethernet to MPLS interworking function 32. This arrangement allows frame relay to be used on attachment circuit B 24 as well as an Ethernet to frame relay network interworking function within CE B 20. Of note, although PE B 14 is shown as including two separate functions 30 and 32, it is contemplated that these logical functions can be performed within a single IWF as two different processes. Network interworking functions, including parameter mappings, etc. are described in detail in the inventors' U.S. patent application Ser. Nos. 11/008,709 and 11/018,671.

QoS Mapping Functions

The QoS mapping functions of the present invention are described with reference to FIG. 3. Three types of mapping functions are described by the present invention. The first is the Ethernet to frame relay (or ATM) attachment circuit mapping function 34. The second is the Ethernet to MPLS mapping function 36. The third is the frame relay (or ATM) to MPLS mapping function 38.

With respect to the Ethernet to frame relay (or ATM) attachment circuit mapping function 34, QoS parameters for AC A 22 and AC B 24 are mapped to each other. For example, the QoS parameters for Ethernet (AC A 22) and frame relay (or ATM) (AC B 24) are mapped to each other. This mapping is independent of the MPLS core network 16. However, this mapping does have an impact on the attachment circuit signaling and configurations, as well as the data plane functions performed by the Ethernet to frame relay network interworking function at PE B 14. AC mappings are relevant within the context of the present invention because edge to edge communications must be arranged to meet the service provider's customers' needs.

As used herein, in general, the term "control plane" includes configured or signaled information that determines the overall behavior, mappings, resource allocation and forwarding parameters that can be applied to all connection frames or frames of a service class. Such information is typically established and used to set up the network devices before any payload traffic is transmitted. The term "data plane" refers to the frame processing functions that typically take place in real-time on a frame-by-frame basis.

With respect Ethernet to MPLS mapping function 36, the Ethernet QoS parameters are mapped to MPLS parameters by PE A 12 and PE B 14. With respect to frame relay to MPLS mapping function 38, PE B 14 can perform QoS mapping directly between frame relay (or ATM) and MPLS rather than in two logical stages. This arrangement can improve mapping accuracy and processing efficiency. Each of mapping functions 34, 36 and 38 are described in detail below.

A. Attachment Circuit Mapping Functions

Ethernet to frame relay (or ATM) attachment circuit mapping function 34 includes functions for service class mapping, service parameters mapping, overhead calculation and discard eligibility mapping. While these mappings are described herein in detail, additional detail can be found in the inventors' U.S. patent application Ser. Nos. 11/008,709 and 11/018,671. In addition, support for multiple classes of service (CoS) can be provided as described in U.S. patent application Ser. Nos. 11/008,709 and 11/018,671, for example by using multiple frame relay (or ATM) connections, or by using p-bits aware or Internet Protocol (IP) DiffServ code-point (DSCP)-aware forwarding onto the frame relay (or ATM) connection.

The present invention also supports mappings from frame relay (or ATM) to Ethernet Virtual Connection (EVC). This arrangement allows increased flexibility for configuration and signaling. Although described herein in detail, additional detail regarding EVC mapping can be found in the inventors' U.S. patent application Ser. Nos. 10/990,899 and 11/011,331.

Service class mapping, service parameters (bandwidth) mapping, overhead calculation and discard eligibility mapping are now described, initially with respect to Ethernet to frame relay, then with respect to Ethernet to ATM. Taking the Ethernet to frame relay case first, service class mapping in the Ethernet to frame relay direction should be arranged such that the Ethernet and frame relay service classes match. An EVC that supports a single class of service can be mapped to a corresponding frame relay Data Link Connection Identifier (DLCI) with similar performance parameters, if any.

Ethernet services supported by the present invention can include well-defined classes with different levels of service, such as Gold, Silver, Bronze, having different frame loss, delay, and jitter guarantees. As used herein, an EVC is a collection of Ethernet frames that are classified and grouped together for the purpose of interworking with frame relay. EVC frames may include all Ethernet frames arriving at an Ethernet port (or on multiple Ethernet ports as described in the multiplexing section later), or the frame belonging to one or more VLANs if the frames arrive on a VLAN aware interface. EVCs are bidirectional point-to-point connections which allow asymmetrical bandwidth profiles in the different directions. An EVC can support single or multiple service classes. This arrangement advantageously allows bandwidth to be optionally defined on a per class of service (CoS) basis. An EVC can be based on the Ethernet port, the Ethernet port and one or more VIDs, one or more MAC source and destination address pairs, or the MAC source, destination address and one or more VIDs.

An EVC can be associated with one or more bandwidth profiles and with one or more forwarding treatment rules for its frames. From a quality of service (QoS) perspective, a single QoS EVC provides a single bandwidth profile and a single forwarding treatment for all frames within the EVC. A multiple CoS EVC provides a single bandwidth profile and multiple forwarding treatments for all frames within the EVC. A multiple QoS EVC provides multiple bandwidth profiles and multiple forwarding treatments for all frames within the EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on EVC type, and of OSI protocol Layer 1-7 fields.

Frame relay services typically include well-defined classes, which can be used for supporting services such as gold, silver, bronze. Each service is distinguished with different frame loss, delay, and jitter parameters. A standard frame relay data link connection (DLC) can only support a single service. The single service includes a two drop precedence that affects discard treatment, but not scheduling behavior. All frames belonging to a service must be delivered in order.

Existing standards such as the International Telecommunications Union (ITU) X.36 Standard defines transfer and discard priorities for frame relay virtual connections. ITU X.36 defines sixteen transfer priority levels (per virtual connection and for each direction), and eight discard priority levels (per virtual connection and for each direction). Frame relay frame transfer and discard priorities are set at subscription time or by signaling.

A number of options are contemplated for mapping Ethernet EVCs where multiple classes of service are supported. One option is to map the entire EVC to a single frame relay DLCI. This option makes efficient use of the frame relay DLCI space while possibly sacrificing performance of some of the classes of service supported by the Ethernet EVC. To maintain service objectives, the frame relay connection class for the service should meet the performance requirements of the most stringent Ethernet service class. Another options is to map each class of service supported by the Ethernet EVC to a separate frame relay DLCI. This option preserves the performance parameters of the different Ethernet classes of service. Additional detail can be found in U.S. patent application Ser. No. 11/008,709.

Rules for service class mapping in the frame relay to Ethernet direction are similar to those in the Ethernet to frame relay direction. Multiple frame relay connections that are supported by a single Ethernet EVC can be configured to be grouped together on the same EVC. Additional detail can be found in U.S. patent application Ser. No. 10/990,899, with the exception that the present invention does not implicate header stripping and rebuilding.

With respect to Ethernet and frame relay service parameters (bandwidth) mapping, it is noted that Ethernet and frame relay traffic parameters are largely the same. Both specify committed information rate (CIR) and excess information rate (EIR) with the associated burst sizes. The most significant difference between the two sets of parameters is that the Ethernet parameters are independent of one another whereas only three of the frame relay parameters are independent. In particular, the standard frame relay traffic parameters include committed burst size ($B_c$) in bits, excess burst size ($B_e$) in bits and Duration ($T_c$) in seconds. At any time interval of duration $T_c$, the frame relay end user is allowed to transmit frames up to its contracted $B_c$ and $B_e$ amount of information.

Ethernet traffic parameters can be based on the Metro Ethernet Forum Standard. The Ethernet traffic parameters include committed information rate ($CIR_E$) in bits per second, excess information rate ($EIR_E$) in bits per second, committed burst size (CBS) in bits, and excess burst size (EBS) in bits. Other units may be used such as bytes/octets. These four Ethernet parameters are set independently.

In the Ethernet to frame relay direction, parameter mapping is $B_c$=CBS, $T_c$=CBS/CIR and $B_e$=EIR*(CBS/CIR). These mapping rules establish that the committed and excess information rates at the Ethernet side should be equal to those at the frame relay side. However, it is noted that the amount of information entering the frame relay network may exceed CIR+EIR over an interval of $T_c$.

In the frame relay to Ethernet direction, parameter mapping is CBS=$B_c$, EBS=Be, CIR=$B_c/T_c$ and EIR=Be/$T_c$. Note that the support of multiple CoS' by an EVC introduces an extra parameter mapping step. The simplest case occurs if the EVC bandwidth is specified for the entire EVC, and the EVC is mapped to a single frame relay connection. In that case, the parameter mappings follow the above formulas. The second case is when the EVC specifies the traffic parameters per CoS, and each CoS traffic is mapped to a separate FR connection. In this case, the traffic parameter mappings are repeated for each CoS using the above formulas. The third case is when the EVC traffic parameters are specified per CoS, but the EVC is mapped to a single FR connection. In this case, the EVC traffic parameters of the different CoS streams are aggregated before performing the conversion to the frame relay connection parameters. The fourth case is when the EVC traffic parameters are specified for the entire EVC, but the EVC is mapped to multiple frame relay connections. In this case, the percentage of the EVC traffic mapped to each frame relay connection is estimated before using the above parameter conversion formulas.

Discard eligibility indication mapping in the Ethernet to frame relay direction establishes the rules to determine when the frame relay discard eligibility (DE) should be set. For green Ethernet frames, DE=0. For yellow Ethernet frames, DE=1. If necessary, additional information can be found in U.S. patent application Ser. No. 11/008,709. Discard eligibility indication mapping in the frame relay to Ethernet direction is accomplished by mapping the frame relay DE bit to the appropriate Ethernet frame color. For DE=0 set the Ethernet frame color to green, and for DE=1 indication set the Ethernet frame color to yellow. The frame color may be encoded in the p-bits field as established by the service provider.

Figure 4:
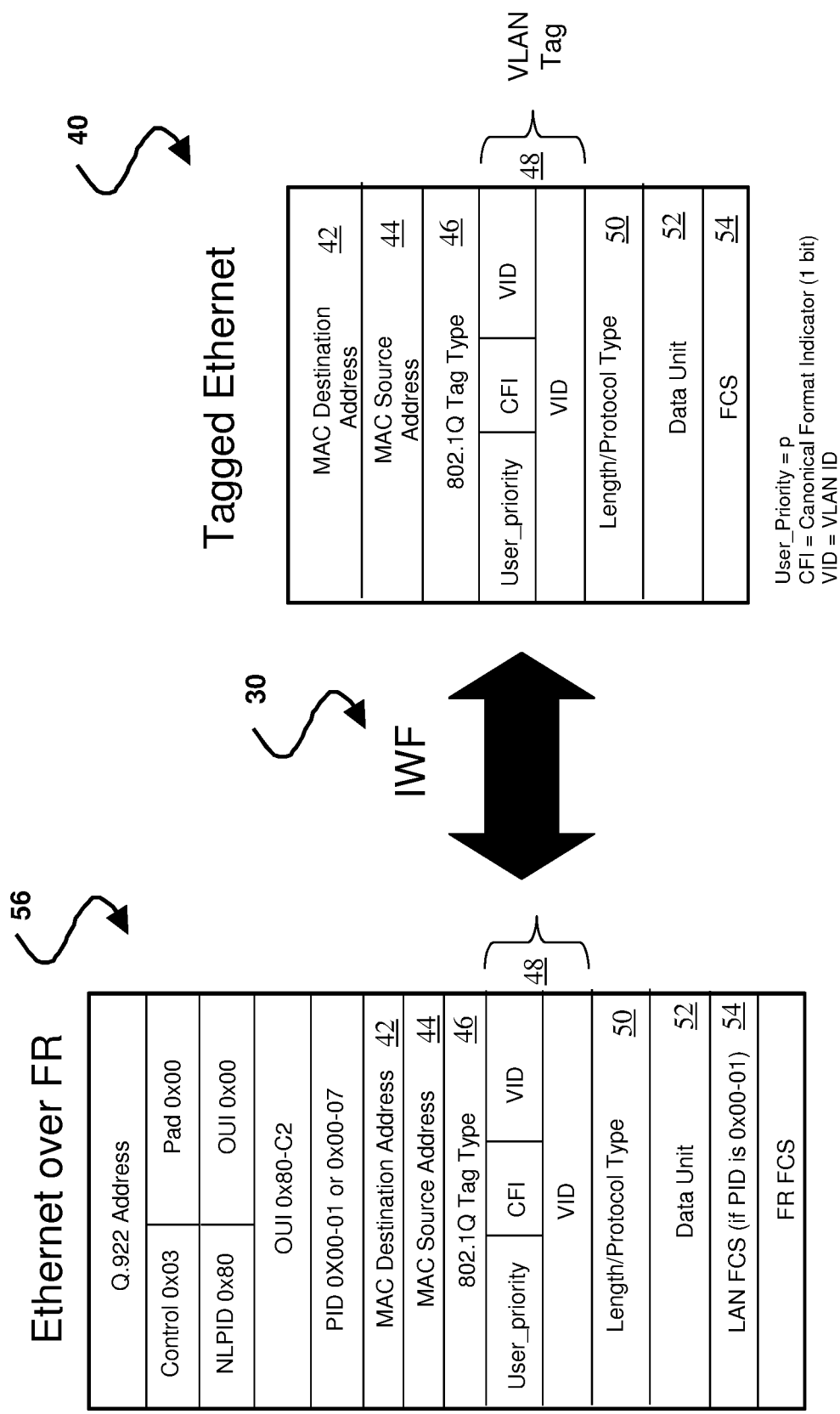
FIG. 4 is an example of an Ethernet frame encapsulated in an frame relay frame.

The traffic parameter mappings should take into account the overhead calculations in order to account for the different overhead introduced by different technologies. For example, FIG. 4 shows how Ethernet MAC frames are encapsulated over FR using the procedure described in RFC 2427. The tagged Ethernet frame 40 includes a six octet destination address 42, a six octet source address 44, a two octet 802.1 tag type 46, a two octet VLAN tag 48, a two octet Length/Protocol Type field 50, and a four octet FCS field 54 (the seven octet preamble and the one octet SFD field are not shown because they are not included in the standard Ethernet traffic parameters). In addition to the addressing and service information, a 46-1500 octet data unit 52 is included in the tagged Ethernet frame 42. Of note, the VLAN tag 48 includes a user priority, also known as "p-bits".

Also as shown in FIG. 4, most of the fields in tagged Ethernet frame 40 are encapsulated within frame relay frame 56 (the opening and closing Flags are not shown, as they are excluded from standard FR traffic parameters). For example, MAC source and destination addresses 42 and 44 are carried transparently in frame 56. If applicable, the 802.1Q tag is also carried transparently. Of note, the device performing the IWF may perform Ethernet value-added functions such as interworking between tagged and untagged interfaces and VLAN to p-bits translation. The remaining unlabelled fields in frame 56 are typical components of an RFC 2427 bridged mode encapsulated frame relay frame.

Based on the Figure, a Q-tagged Ethernet MAC frame contains 22 bytes of overhead (excluding the preamble). Encapsulating Ethernet MAC frames over frame relay adds 12 or 8 bytes of header depending on whether Ethernet FCS is transported or not. This header is a result of the frame relay header which is equal to 4 bytes (assuming the common 2 bytes address format), and the encapsulation header that is set at 8 bytes. If $E_{Avg}$=the average Ethernet frame size (including payload and MAC header) and Ov=the Ethernet-over-FR overhead (12 or 8 bytes in the described example), then a correction factor C is needed to account for the different overhead. The correction factor C is given by:

$$C = \frac{E_{Avg}}{Ov + E_{Avg}}$$

As such, in the Ethernet to frame relay direction, the rates should be divided by C. In the frame relay to Ethernet direction, the rates should be multiplied by C.

Mappings between Ethernet and ATM are described next. ATM virtual connection cell transfer and discard priorities can be established based on the ATM connection service category and the CLP indication. ATM services typically include well-defined classes as described above, which can be used for supporting services such as gold, silver, bronze. Each service is distinguished with different parameters. FIG. 5 is a table 58 showing the relationship between ATM service categories and parameters. Table 58 includes ATM layer service categories 60 and ATM parameters 62. ATM parameters 62 include traffic parameters 64 and QoS parameters 66 which themselves include various combinations of parameters for peak cell rate (PCR), cell delay variation tolerance (CDVT), sustained cell rate (SCR), maximum burst size (MBS), minimum desired cell rate (MDCR), maximum frame size (MFS), cell delay variation (CDV), cell transfer delay (CTD) and cell loss ratio (CLR). These individual parameters are known in the art and are not further described herein. ATM service layer categories 60 are either "specified", "unspecified" or are not applicable (N/A) for these various combinations of parameters 62.

In accordance with the present invention, Ethernet services should be mapped to an equivalent ATM service. For example, an Ethernet service class should be mapped to an ATM service class with the same performance expectations in terms of loss, delay, and jitter. In the Ethernet to ATM direction, an Ethernet EVC that supports a single class of service should be mapped to an ATM virtual connection (VC) with a service category that can achieve the performance requirements of the Ethernet EVC. For example, if the Ethernet EVC supports real time application with stringent delay requirements, it can be mapped to an ATM CBR or rt-VBR VC service category 60. Similar to the mapping in the frame relay case, an Ethernet EVC that supports multiple classes of service may be mapped to a single ATM VC or multiple ATM VCs, with each class of service being mapped to a distinct ATM circuit. To maintain service objectives, if a single ATM connection is used, its service category should be chosen to meet the performance requirements of the most stringent Ethernet service class. Note that this is an engineering guideline which could be changed by such factors as network policy, cost consideration, and ATM QoS availability.

Mapping rules in the ATM to Ethernet direction are similar to those in the Ethernet to ATM direction. Multiple ATM connections that are supported by a single EVC would be configured to be grouped together on the same EVC at the interworking function.

Mapping of service (bandwidth) parameters between Ethernet and ATM are described for the case of a 1-to-1 mapping of an EVC to an ATM virtual channel connection (VCC). Traffic parameters are relevant to the mapping function because such parameters are used by many QoS functions such as traffic policing and monitoring, bandwidth reservation, admission control and scheduler configuration.

ATM Standards define a number of traffic parameters. Peak Cell Rate (PCR) and Cell Delay Variation Tolerance (CDVT) are defined for all service categories 60.

Sustained Cell Rate (SCR) and Maximum Burst Size (MBS) are defined for the variable bit rate (VBR) services only. Minimum Desired Cell Rate (MDCR) is defined for the UBR+ service only. The UBR+ service is also known as UBR with MDCR service.

Ethernet services are defined by four parameters as discussed above with respect to frame relay mapping. Some of these parameters may be set to zero/unused depending on service definition. Exemplary mappings are described below, it being understood that alternate mappings/variations may be implemented based on network policy and configuration. Also, some mapping margins may be added to compensate for increased jitter by the various network segments or the IWFs.

In the Ethernet to ATM direction, the following exemplary mappings should be used. $PCR_{0+1}=CIR+EIR$ (ATM traffic shaping is recommended if the traffic is policed downstream in the ATM network). Alternatively, as a conservative option, $PCR_{0+1}=AR$ where AR is the Ethernet access rate. In either case, CDVT is configured.

Additionally, for the VBR services: MBS=CBS/(1−CIR/AR)+1; for VBR.1: $SCR_{0+1}=CIR$; and for VBR.2 & VBR.3: $SCR_0=CIR$. For the UBR+ service: MDCR=CIR. For the ABR and GFR services, MCR=CIR. Of note, in any case, if any of the resulting rates is greater than the ATM link rate, the resulting rate should be capped at ATM link rate.

In the ATM to Ethernet direction, the following exemplary mappings should be used. For CBR: $CIR=PCR_{0+1}$, and CBS=CDVT*AR or is manually configured. EIR & EBS=0. For VBR.1: $CIR=SCR_{0+1}$, CBS=MBS(1−CIR/AR), EIR=0, EBS=0 and the tagging option is not allowed. For VBR.2 & VBR.3: $CIR=SCR_0$, CBS=MBS(1−CIR/AR), $EIR=PCR_{0+1}-SCR_0$, and EBS=CDVT*AR or is manually configured. For GFR: CIR=MCR, CBS=MBS(1−CIR/AR), $EIR=PCR_{0+1}-MCR$, and EBS=CDVT*AR or is manually configured. It is noted that VBR.2 allows tagging by the customer only, while VBR.3 allows tagging by the customer and/or by the network service provider. For UBR: CIR=0, CBS=0, $EIR=PCR_{0+1}$, and EBS=CDVT*AR or is manually configured. For UBR+: CIR=MDCR, CBS is configurable, $EIR=PCR_{0+1}-CIR$ and EBS=CDVT*AR or is manually configured. For ABR: CIR=MCR, CBS is configurable, $EIR=PCR_{0+1}-CIR$ and EBS=CDVT*AR or is manually configured. If any of the resulting rates is greater than Ethernet link rate, the rate should be capped at the Ethernet link rate.

It is noted that the support of multiple CoS' by an EVC introduces an extra parameter mapping step. The simplest case occurs if the EVC bandwidth is specified for the entire EVC, and the EVC is mapped to a single ATM connection. In this case, the parameter mappings follow the rules described above. The second case is when an EVC specifies the traffic parameters per CoS and traffic corresponding to each CoS is mapped to a separate ATM connection. In this case, the traffic parameter mappings are repeated for each CoS using the above-described mapping rules. The third case is when the EVC traffic parameters are specified per CoS, but the EVC is mapped to a single ATM connection. In this case, the EVC traffic parameters of the different CoS streams must be aggregated before performing the conversion to the ATM connection parameters. The fourth case is when the EVC traffic parameters are specified for the entire EVC, but the EVC is mapped to multiple ATM connections. In this case, the percentage of the EVC traffic mapped to each ATM connection must be estimated before using the above parameter conversion rules.

Like discard eligibility indication mapping for the Ethernet to frame relay case, drop precedence indication is mapped between Ethernet and ATM. The Ethernet to ATM direction establishes the rules to determine when the cell loss priority (CLP) bit should be set. For green Ethernet frames, CLP=0 in all ATM cells of the frame. For yellow Ethernet frames, CLP=1 in all ATM cells of the frame. If necessary, additional information can be found in U.S. patent application Ser. No. 11/018,671. Drop precedence indication mapping in the ATM to Ethernet direction is accomplished by determining whether any cell has its CLP=1. If so, the entire Ethernet frame is set to yellow. Otherwise, the frame color is green. The frame color may be encoded in the p-bits field as established by the service provider.

Overhead calculation is described next. Initially, reference is made to FIG. 6 which shows an Ethernet over ATM encapsulation format. The IWF 68 (same as IWF 30 but performing Ethernet to ATM networking interworking) performs RFC 2684 LLC encapsulation of Ethernet over ATM, and mapping between the Ethernet frame and ATM fields to form ATM ALL5 frame 70. Techniques for encapsulation in accordance with RFC 2684 are known by those of skill in the art. For LLC encapsulation, bridged protocol data units (PDUs) are formed into packets and encapsulated by identifying the type of the bridged media in the SNAP header. The presence of the SNAP header is indicated by the LLC header 72 value 0xAA-AA-03 and the OUI 74 value in the SNAP header is the 802.1 organization code 0x00-80-C2. The type of bridged media is specified by the two octet PID 76. The PID also indicates whether the original frame check sequence (FCS) 54 is preserved within the bridged PDU. The PDU format also includes a 2 octet PAD data field 78. Of course, the specific fields and codes are provided merely by way of example, and the invention is not limited solely to the described embodiment.

Encapsulation of the Ethernet frame over ATM in accordance with the present invention is explained with reference to FIG. 6. As is readily shown, most of the fields in tagged Ethernet frame 40 are encapsulated within ATM AAL-5 frame 70. For example, MAC source and destination addresses 42 and 44 are carried transparently in frame 70. If applicable, the 802.1Q tag is also carried transparently. Of note, the device performing the IWF may perform Ethernet value-added functions such as interworking between tagged and untagged interfaces and VLAN to p-bits translation.

Figure 6:
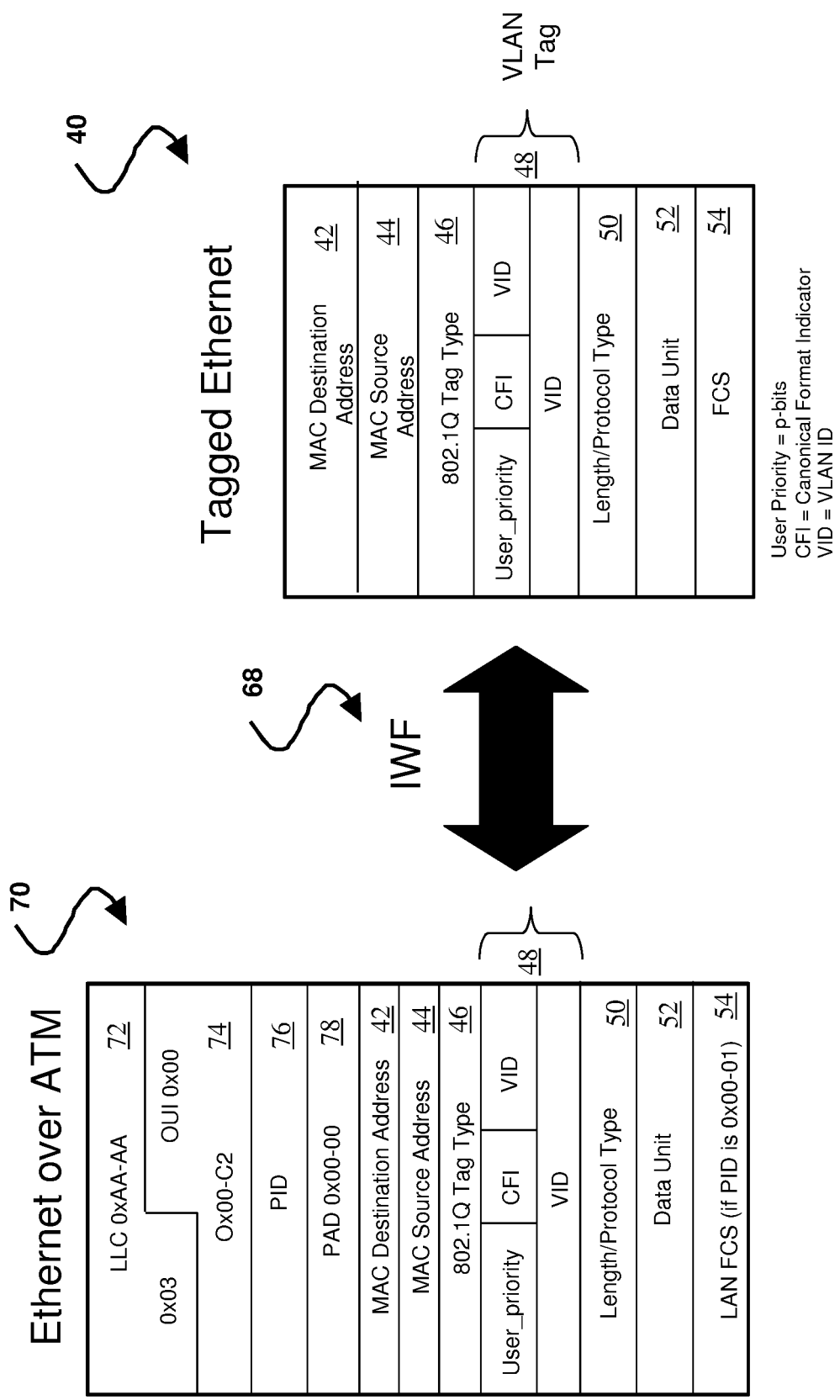
FIG. 6 is an example of an Ethernet frame encapsulated in an ATM ATM Adaptation Layer Type 5 (AAL5) frame.

As is shown in FIG. 6, the Ethernet and ATM AAL5 encapsulated frame formats are different. Excluding the preamble and the SFD, the Ethernet header length ($h_E$) is 22 bytes if the MAC FCS is preserved or 18 bytes if the MAC FCS is not preserved. The header length is reduced by 4 bytes for untagged Ethernet frames. The ATM header includes fields in the ATM frame other than the data field.

The IWF encapsulates the MAC frame starting at the MAC Destination Address and uses this information as the payload of the AAL-5 Common Part Convergent Sublayer-Protocol Data Unit (CPCS-PDU). AAL-5 adds two types of overhead, namely, an AAL-5 trailer ($h_{trailer}$) of 8 bytes and AAL-5 SAR overhead of between 0 and 47 bytes. Of note, the AAL-5 CPCS-PDU length must be an integer multiple of 48 bytes. Accordingly, the number of cells ($N_{cells}$) needed to transport 'm' bytes of data is Ceiling($(m+h_E+h_{trailer}+h_{LLC})/48$). Recall that cell size, excluding overhead, is 48 bytes. $N_{cells}$ is therefore equal to the smallest integer that is greater than or equal to x where x is $((m+h_E+h_{trailer}+h_{LLC})/48)$.

A correction factor maps rates between Ethernet and ATM networks. Assuming a data length of 'm', the correction factor $a=N_{cells}*53/(m+h_E)$. Defining $E_{Avg}$ as the average Ethernet frame size including the Ethernet header, the correction factor $a=N_{cells}*53/E_{Avg}$. In the Ethernet to ATM direction, Ethernet rate values are multiplied by 'a'. For example, SCR=a*CIR assuming that both SCR and CIR are expressed in the same bytes/second unit (note that SCR rate may be subsequently divided by the ATM cell size of 53 bytes to convert the rate to conventional ATM traffic unit of cells/second). In the ATM the Ethernet direction, the ATM rate values are divided by 'a', for example, CIR=SCR/a (or the original Ethernet traffic parameters are restored). Note that $h_{LLC}$ is the overhead due to RFC 2684 bridged mode encapsulation of Ethernet frames over ATM (for example, 8 bytes for LLC mode+2 bytes for padding).

As a specific example, assume a data unit length of n=20 bytes, a Q tagged Ethernet frame, and the FCS is preserved. Ignoring the RFC 2684 encapsulation overhead, $N_{cells}$=Ceiling($(20+22+8)/48$)=2. $N_{cells}$ also =2 with RFC 2684 LLC encapsulation because the additional 10 bytes ($(20+22+8+10)/48$) does not change the resultant calculation in this case. The number of ATM bytes needed to transmit 20 bytes of data unit information=2*53=106 bytes. The number of Ethernet bytes needed to transmit 20 bytes of data unit information=20+22=42 bytes. As such, the overhead factor 'a' is a=106/42=2.52.

The calculations are carried out in control plane (per connection), not for every frame. They are typically done in SW, however they could also be completed by hardware or firmware configured to perform the appropriate functions.

B. Ethernet to MPLS QoS Mapping Functions

Referring again to FIG. 3, Ethernet to MPLS QoS mapping 36 includes control plane and data plane functions. PE A 12 and PE B 14 perform Ethernet to MPLS mapping in the Ethernet to MPLS direction. This mapping methodology is described in detail below with respect to control plane functions and data plane functions. As described above with respect to mapping functions 38, control plane functions include connection mapping, service class mapping, service parameters (bandwidth) mapping and overhead calculation. Data plane functions include Ethernet frame CoS mapping to MPLS experimental (EXP) bits and discard eligibility mapping.

A brief overview of MPLS with differentiated services is provided to aid understanding of the mapping functions. If the MPLS network 16 supports Differentiated Services (DiffServ) Behavior Aggregates, such as are defined in RFC 3270, MPLS packets can be treated with different priorities on a Per Hop Behavior (PHB) basis. In such a case, two different types of label switched paths (LSPs) are defined, which can both be used for the transport LSP, namely Label-Only-Inferred-PSC LSPs (L-LSP) and EXP-Inferred-PSC LSPs (E-LSP).

If an L-LSP is used as a transport LSP, the PHB scheduling class (PSC) of each packet is inferred from the label without any other information, e.g., regardless of the EXP field value. In this case the EXP field can be used for indicating the packet drop precedence. If an E-LSP is used as a transport LSP, the EXP field of the transport label is used to determine the PHB to be applied to each packet. As such, different packets in one LSP can receive a different QoS treatment. The 3-bit EXP field of the transport label can represent eight different combinations of PHB, which indicate up to eight scheduling and/or drop precedence levels. The mapping of the PHB to EXP fields is either explicitly signaled at label set-up or can be based on a pre-configured mapping. If an LSP is used as a transport LSP, the LSP should be arranged to meet the most stringent QoS requirements of the multi-service connections transported by the LSP.

An understanding of MPLS traffic parameters and assumptions about these traffic parameters can also aid understanding of the mapping functions of the present invention. Initially, a controlled load service is assumed. A controlled load service is essentially equivalent to best effort service in a lightly loaded network in which desired bandwidth is indicated, but delay and loss levels may not be specified. By analogy, controlled load is somewhat like ATM nrt-VBR or UBR+/ABR with MCR specified.

MPLS resource reservation protocol (RSVP) parameters include: "p", "(r, b)", "m", and M. "p" is the peak rate and no peak conformance definition is given. In this case "p" appears to be like an access rate. However, "p" is not exactly the same as PCR in ATM because PCR has some tolerance (CDVT) associated with it. "(r, b)" follows a leaky bucket model where "r" is the token rate, "b" is the token bucket size. "m" is the smallest enforceable PDU size where any packet shorter than "m" will be counted as "m" in the "(r, b)" bucket. "M" is the maximum enforceable PDU size and packets longer than "M" are dropped. Of note, these parameters represent traffic volume exclusive of link layer overhead.

For Ethernet to MPLS QoS mapping it is assumed that the Ethernet AC conforms to the Metro Ethernet Forum (MEF) specification related to Service Models and Traffic Management. As noted above, an EVC can support multiple classes of service based on the use of the Ethernet priority bits and there are proposed extensions that would determine the frame CoS based on VLAN-ID, IP DSCP, or any Layer 1-Layer 7 protocol fields. The EVC can also have associated traffic parameters for the entire EVC or per class of service.

An Ethernet Virtual Connection (EVC) is carried over an Ethernet pseudo wire in which the pseudo wire is either mapped to a dedicated MPLS tunnel, e.g., for premium services with guaranteed core bandwidth, or more commonly is aggregated with other connections and services on the PE-to-PE (such as PE A 12 to PE B 14) MPLS tunnel.

An EVC that supports a single CoS can be mapped to an E-LSP or an L-LSP. An EVC that supports multiple CoS can be mapped to a group of L-LSPs or E-LSPs each supporting a separate CoS. Alternatively, the EVC can be mapped to a single E-LSP with the EXP bits used for the support of multiple CoS. In order to maintain service objectives, the MPLS tunnel class of service should meet the performance requirements of the most stringent Ethernet service class.

With respect to drop precedence, the forwarding treatment inside the MPLS networking should be based on the CoS Identifier associated with the EVC frame. The Ethernet frame drop precedence (green or yellow) should be mapped to the appropriate EXP bits code point.

Mapping of the QoS traffic parameters in the Ethernet to MPLS direction in the non-aggregated MPLS case should be arranged such that p=CIR+EIR, r=CIR, b=CBS and m and M are configured. Note that traffic shaping may be required to smooth the traffic burstiness on the MPLS side, particularly in the non-aggregated case when the LSP tunnel is policed by a downstream node.

The traffic parameter mappings should also take into account the overhead calculations between the Ethernet AC (such as AC A 22) and the MPLS network 16 core. The mapping should account for the protocol stack overhead at the access and MPLS 16 core (exclusive of the MPLS media overhead), and the average frame size.

The support of multiple CoS by the EVC introduces an extra parameter mapping step. The simplest case occurs if the EVC bandwidth is specified for the entire EVC, and the EVC is mapped to a single LSP tunnel. In this case, the parameter mappings follow the above described rules. The second case is when the EVC specifies the traffic parameters per CoS and traffic corresponding to each CoS is mapped to a separate LSP tunnel. In that case, the traffic parameter mappings are repeated for each CoS using the above mapping rules. The third case is where the EVC traffic parameters are specified per CoS, but the EVC is mapped to a single LSP tunnel. In this case, the EVC traffic parameters of the different CoS streams should be aggregated before performing the conversion to the LSP tunnel parameters. The fourth case occurs when the EVC traffic parameters are specified for the entire EVC, but the EVC is mapped to multiple LSP tunnels. In this case, the percentage of the EVC traffic mapped to each LSP tunnel must be estimated before using the above parameter conversion formulas or admission control functions.

In the common case when multiple pseudo wires for Ethernet EVCs or other service type connections are aggregated on an MPLS tunnel, an edge Connection Admission Control (CAC) function should be performed for admitting each connection within the MPLS tunnel. The concepts of MPLS traffic engineering which are used for admitting the tunnels on MPLS network 16 core can be adapted for bandwidth management at the edge. Such concepts include the use of multiple class types/bandwidth pools, and overbooking.

No mapping is required in the MPLS to Ethernet direction. In the heterogeneous AC case, the AC parameters are directly mapped between the Ethernet, frame relay and ATM ACs according to the rules set out above.

Figure 7:
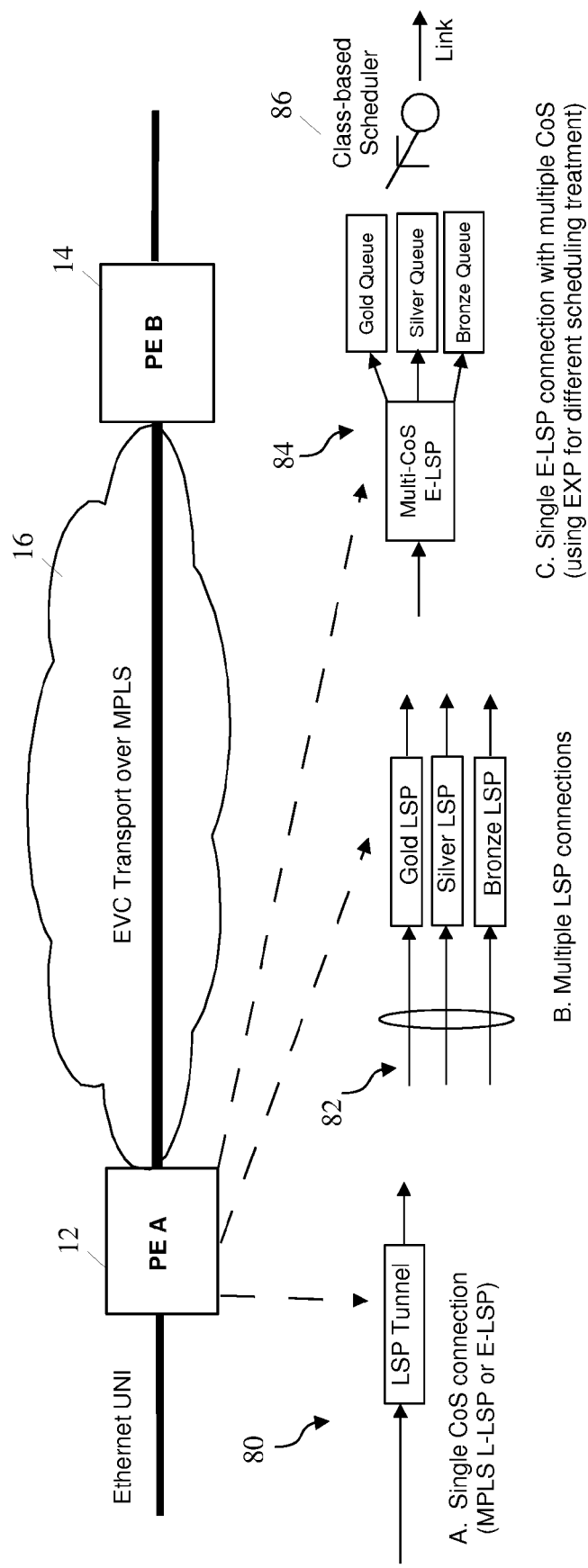
FIG. 7 is a block diagram showing examples of Ethernet to MPLS connection mapping.

Ethernet to MPLS connection mapping is discussed with reference to FIGS. 7 and 8. FIG. 7 is a block diagram showing examples of Ethernet to MPLS connection mapping in which the connection mapping shown is performed by the ingress PE, PE A 12 in this case, in the Ethernet to MPLS direction. An EVC can be transported in the MPLS network 16 core using one or a combination of a single CoS connection 80 mapped to a single LSP tunnel, multiple LSPs 82 in which each LSP supports a single Ethernet CoS, and a single multi-CoS E-LSP 84 in which a single E-LSP connection uses a class-based scheduler 86 to service the different queues (gold, silver and bronze). In addition, an LSP or LSP group can be assigned to a single premium EVC. However, it is often more desirable to aggregate a number of EVCs and even other non-Ethernet services on the same transport LSP tunnel.

FIG. 8 is a table showing bandwidth mapping for different types of EVCs. Table 88 shows how mappings between the connection and bandwidth profiles are established based on the MPLS transport tunnel type 90 and the EVC type 92. For example, where MPLS transport tunnel type 90 is a group of single CoS LSPs 82, and the EVC type 92 is a multi-CoS EVC having a single bandwidth profile, the bandwidth (BW) profile is split based on the forwarding map. Of note, table 88 assumes a connection-oriented MPLS network 16. In addition, MPLS L-LSP and E-LSP MPLS network 16 core connection types are used for single CoS connections, while MPLS E-LSP is used for multiple CoS connections.

Admission control for aggregated MPLS tunnels can be considered when multiple EVCs map to a single MPLS LSP. In such a case, there is no one-to-one correspondence between traffic parameters of the Ethernet and LSP connections. Nevertheless, the rules described above for the non-multiplexing case for Ethernet to MPLS traffic parameters mapping can help with the Connection Admission Control and network engineering functions.

Hierarchical Connection Admission Control (CAC) is performed for admitting first the LSP tunnel on the link, and next for admitting the EVCs onto the LSP. The LSP is initially established with enough bandwidth to accommodate the total anticipated Ethernet traffic between the two IWFs, for example PE A 12 and PE B 14. A "transport" admission control function is performed to admit the LSP on the physical or logical link. The equivalent bandwidth of the LSP is then computed. This bandwidth provides the virtual pipe capacity that is used to admit the EVCs. Next, the CAC function can be executed to admit the EVCs on the LSP pipe. In this case, the equivalent bandwidth of the Ethernet connection is calculated from its traffic parameters, overhead conversion, required CoS (typically frame loss ratio), the size of the LSP connection, and the underlying link capacity. Details of the CAC functions are beyond the scope of this invention and are not explained herein.

Of note, when supporting connections multiplexing over multiple LSPs, another step/extension is required. In this case, the bandwidth management function should account for each service class-per-LSP separately. This can be done either from the EVCs' service class bandwidth profiles, or based on an estimate of the bandwidth profile for each LSP if the BW profile is not broken down per service class.

C. Frame Relay/ATM to MPLS Direct QoS Mapping Functions

Referring again to FIG. 3, frame relay (or ATM) to MPLS QoS mapping 36 is explained. As noted above, PE B 14 can be arranged to perform QoS mapping directly between frame relay/ATM and MPLS rather than in two stages. Both frame relay to MPLS QoS mapping and ATM to MPLS QoS mapping are described.

With respect to frame relay to MPLS QoS mapping, at the ingress PE, for example PE B 14, the frame relay protocol is terminated and the frame is transported over MPLS network 16 in the form of an Ethernet Pseudo Wire. Many of the methods described above for Ethernet to MPLS QoS mapping are applicable to the frame relay AC to MPLS mapping. This is facilitated by the fact that the Ethernet and frame relay traffic parameters are almost identical. However, there are some differences which relate to differences in the definitions of EVC and frame relay DLCIs and the fact that, unlike an Ethernet EVC, a standard frame relay DLCI only supports a single CoS.

The CoS type of the incoming frames can be determined either from the frame relay CoS as determined by the DLCI or by the use of Ethernet frame CoS indicators such as the p-bits or VLAN-ID, if supported. As in the Ethernet case, a frame relay connection can be mapped to a single LSP or aggregated with other connections on MPLS network 16 between PE A 12 and PE B 14.

When FR CoS indicators are used for CoS determination, the entire frame relay DLCI should be mapped to a single LSP that receives the same CoS treatment as the frame relay connection. If the Ethernet frame CoS is used, then the frame relay DLCI frames can be mapped to different MPLS LSPs or to an E-LSP with multiple CoS as described above with respect to Ethernet.

In the non-aggregated case with a single CoS, the mapping of the QoS traffic parameters in the MPLS direction are set out as p=(Bc+Be)/Tc, r=Bc/Tc, b=Bc and m and M are configured. Traffic shaping may be required to smooth the traffic burstiness on the MPLS side, particularly when the LSP tunnel is policed by a downstream node. The traffic parameter mappings must take into account the overhead calculations between the frame relay AC and the MPLS network 16 core. The mapping should account for the protocol stack overhead at the access and core exclusive of the MPLS media overhead, as well as the average frame size.

The mapping is more complicated in the multi-CoS case when the frame relay DLCI frames are mapped to multiple LSPs. In this case, an estimate must be made of the amount of frame relay traffic that is directed to every MPLS tunnel. Aggregation techniques and edge CAC are required when multiple connections share an MPLS tunnel. These techniques and edge CAC are similar to the methods described above for Ethernet to MPLS QoS mapping.

No mapping is required in the MPLS to frame relay direction. In the heterogeneous AC case, the AC parameters are directly mapped between the Ethernet, frame relay, and ATM ACs according to the rules specified above.

With respect to ATM to MPLS QoS mapping, at the ingress PE, for example PE B 14, the ATM protocol is terminated and the frame is transported over MPLS network 16 in the form of an Ethernet Pseudo Wire. Many of the methods described above for Ethernet to MPLS QoS mapping are applicable to the ATM AC to MPLS mapping. However, there are some differences which relate to differences in the definitions of EVC and ATM VC QoS parameters and the fact that, unlike an Ethernet EVC, a standard ATM VC only supports a single CoS.

The CoS type of the incoming frames can be determined either from the ATM QoS as specified for the ATM VCC or by the use of Ethernet frame CoS indicators such as the p-bits or VLAN-ID, if supported. As in the Ethernet case, a ATM connection can be mapped to a single LSP or aggregated with other connections on MPLS network 16 between PE A 12 and PE B 14.

When ATM QoS indicators are used for CoS determination, the entire ATM VC should be mapped to a single LSP that receives the same CoS treatment as the ATM connection. If the Ethernet frame CoS is used, then the ATM VC frames can be mapped to different MPLS LSPs or to an E-LSP with multiple CoS as described above with respect to Ethernet.

In the non-aggregated case with a single ATM QoS, the mapping of the QoS traffic parameters in the ATM (assuming a VBR service category) to MPLS direction are set out as p=PCR, r=SCR, b=MBS*(1−SCR/PCR) and m and M are configured. The traffic parameter mappings must take into account the overhead calculations between the ATM AC and the MPLS network 16 core. The mapping should account for the protocol stack overhead at the access and core exclusive of the MPLS media overhead, as well as the average frame size.

The mapping is more complicated in the multi-CoS case when the ATM VC frames are mapped to multiple LSPs. In this case, an estimate must be made of the amount of ATM traffic that is directed to every MPLS tunnel. Aggregation techniques and edge CAC are required when multiple connections share an MPLS tunnel. These techniques and edge CAC are similar to the methods described above for Ethernet to MPLS QoS mapping.

No mapping is required in the MPLS to ATM direction. In the heterogeneous AC case, the AC parameters are directly mapped between the Ethernet, frame relay, and ATM ACs according to the rules specified above.

Although the present invention is described herein using point-to-point ACs that are directly connected to a service provider network such as MPLS network 16 using user-to-network interfaces (UNI), it is contemplated that the present invention can also be implemented using network-to-network interfaces (NNI) between service providers/networks. It is further contemplated that the inventive techniques described herein can be implemented sing multi-point services such as the Ethernet Virtual Private LAN Service (VPLS).

The present invention advantageously provides a system, method and function that allows quality of service support across disparate networking technologies such as frame relay, ATM, Ethernet, and Multiprotocol Label Switching (MPLS). The present invention can be realized in hardware, software, or a combination of hardware and software. An implementation of the method and system of the present invention can be realized in a centralized fashion in one computing system, or in a distributed fashion where different elements are spread across several interconnected computing modules. Any kind of computing system, or other apparatus adapted for carrying out the methods described herein, is suited to perform the functions described herein. While it is contemplated that the invention can be implemented in a switch or router networking device, many of the functions can be implemented in Application Specific Integrated Circuits (ASICs), field programmable gate arrays (FPGAs), or network processor firmware. Under these arrangements software in conjunction with a CPU configures the hardware devices and typically performs control plane functions, OAM, etc.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. An interworking device for maintaining quality of service parameters for transmissions as an Ethernet service between a first network having a first communication protocol and a second network having a second communication protocol that is different from the first communication protocol, the interworking device including:
    a first network interface configured to communicate with the first communication network using the first communication protocol;
    a second network interface configured to communicate with the second communication network using the second communication protocol; and
    a processor in communication with the first network interface and the second network interface, the processor configured to:
        receive frames from the first network in the first communication protocol;
        map at least one parameter corresponding to a quality of service bandwidth mapping parameter in the first communication protocol to at least one quality of service parameter in the second communication protocol, the at least one quality of service parameter in the second communication protocol being selected from a group consisting of token bucket size and token rate, the mapping of at least one parameter being based at least in part on a specified Ethernet Virtual Connection (EVC) bandwidth; and
        assemble data packets in the second communication protocol, the assembled data packets comprising at least one mapped quality of service parameter.

2. The interworking device according to claim 1, wherein the first communication protocol is Ethernet protocol and the second communication protocol is MPLS protocol.

3. The interworking device according to claim 2, wherein Ethernet traffic is arranged as an Ethernet Virtual Connection (EVC) carried over an Ethernet pseudowire.

4. The interworking device according to claim 3, wherein the processor is further configured to map the Ethernet pseudowire to a dedicated MPLS tunnel.

5. The interworking device according to claim 3, wherein the processor is further configured to aggregate the Ethernet pseudowire with at least one other connection in an MPLS tunnel.

6. The interworking device according to claim 1, wherein the first communication protocol is MPLS protocol and the second communication protocol is Ethernet protocol.

7. The interworking device according to claim 6, wherein the processor is further configured to:
    map an EVC that supports a single Ethernet class of service to an MPLS label switched path (LSP); and
    map an EVC that supports multiple Ethernet classes of service to one of:
    a plurality of LSPs, each LSP supporting a single Ethernet class of service; and
    MPLS experimental (EXP) bits within a single LSP, the EXP bits being arranged to correspond to different Ethernet classes of service.

8. The interworking device according to claim 1, wherein the at least one parameter in the second protocol corresponds to at least one Ethernet traffic parameter.

9. The interworking device according to claim 8, wherein the at least one Ethernet traffic parameter is selected from a group consisting of:
    committed information rate (CIR);
    excess information rate (EIR);
    committed burst size (CBS); and
    excess burst size (EBS).

10. The interworking device according to claim 2, wherein the processor is further configured to determine a forwarding treatment for traffic in the MPLS protocol based on an Ethernet protocol class of service identifier.

11. A method of maintaining quality of service parameters for transmissions as an Ethernet service between a first network having a first communication protocol and a second network having a second communication protocol that is different from the first communication protocol, the method comprising:
    receiving frames from the first network interface in the first communication protocol;
    mapping at least one parameter corresponding to a quality of service bandwidth mapping parameter in the first communication protocol to at least one quality of service parameter in the second communication protocol, the at least one quality of service parameter in the second communication protocol being selected from a group consisting of token bucket size and token rate, the mapping of at least one parameter being based at least in part on a specified Ethernet Virtual Connection (EVC) bandwidth; and assembling data packets in the second communication protocol, the assembled data packets comprising at least one mapped quality of service parameter.

12. The method according to claim 11, wherein the first communication protocol is Ethernet protocol and the second communication protocol is MPLS protocol.

13. The method according to claim 12, further comprising arranging Ethernet traffic as an Ethernet Virtual Connection (EVC) carried over an Ethernet pseudowire.

14. The method according to claim 13, further comprising mapping the Ethernet pseudowire to a dedicated MPLS tunnel.

15. The method according to claim 14, further comprising aggregating the Ethernet pseudowire with at least one other connection in an MPLS tunnel.

16. The method according to claim 11, wherein the first communication protocol is MPLS protocol and the second communication protocol is Ethernet protocol.

17. The method according to claim 16, further comprising:
mapping an EVC that supports a single Ethernet class of service to an MPLS label switched path (LSP); and
mapping an EVC that supports multiple Ethernet classes of service to one of:
a plurality of LSPs, each LSP supporting a single Ethernet class of service; and
MPLS experimental (EXP) bits within a single LSP, the EXP bits being arranged to correspond to different Ethernet classes of service.

18. The method according to claim 11, wherein the at least one parameter in the second protocol corresponds to at least one Ethernet traffic parameter.

19. The method according to claim 18, wherein the at least one Ethernet traffic parameter is selected from a group consisting of:
committed information rate (CIR);
excess information rate (EIR);
committed burst size (CBS); and
excess burst size (EBS).

20. The method according to claim 12, comprising determining a forwarding treatment for traffic in the MPLS protocol based on an Ethernet protocol class of service identifier.

* * * * *